(12) United States Patent
Ching et al.

(10) Patent No.: US 11,903,101 B2
(45) Date of Patent: Feb. 13, 2024

(54) INTERNAL HEATING TRACE ASSEMBLY

(71) Applicant: GOODRICH CORPORATION, Charlotte, NC (US)

(72) Inventors: Nathaniel Ching, Hartville, OH (US); Jin Hu, Hudson, OH (US); Casey Slane, Tallmadge, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 182 days.

(21) Appl. No.: 16/713,442

(22) Filed: Dec. 13, 2019

(65) Prior Publication Data
US 2021/0185771 A1   Jun. 17, 2021

(51) Int. Cl.
*H05B 3/14* (2006.01)
*H05B 3/44* (2006.01)

(52) U.S. Cl.
CPC .............. *H05B 3/44* (2013.01); *H05B 3/141* (2013.01); *H05B 2203/02* (2013.01); *H05B 2203/021* (2013.01)

(58) Field of Classification Search
CPC ... H05B 3/16; H05B 3/18; H05B 3/44; H05B 3/46; H05B 3/48; H05B 3/141; H05B 2203/02; H05B 2203/021
See application file for complete search history.

(56) References Cited

U.S. PATENT DOCUMENTS

| | | |
|---|---|---|
| 4,642,024 A | 2/1987 | Weidner |
| 4,700,054 A | 10/1987 | Triplett et al. |
| 4,791,277 A * | 12/1988 | Montierth ................ H05B 3/56 219/535 |
| 4,849,611 A * | 7/1989 | Whitney ................ H05B 3/141 219/538 |
| 4,874,925 A | 10/1989 | Dickenson |
| 4,899,032 A | 2/1990 | Schwarzl et al. |
| 5,165,847 A | 11/1992 | Proctor |
| 5,922,233 A * | 7/1999 | Ohashi ..................... H05B 3/56 219/528 |
| 6,111,234 A * | 8/2000 | Batliwalla ................ H05B 3/56 219/544 |
| 6,146,091 A | 11/2000 | Watanabe |
| 6,350,969 B1 | 2/2002 | Rothchild |
| 6,537,359 B1 | 3/2003 | Spa |
| 6,868,676 B1 | 3/2005 | Haynes |

(Continued)

FOREIGN PATENT DOCUMENTS

| | | |
|---|---|---|
| WO | 2018089645 | 5/2018 |
| WO | 2019128484 | 4/2019 |

OTHER PUBLICATIONS

European Patent Office, European Search Report dated Mar. 31, 2021 in Application No. 20201810.7.

(Continued)

*Primary Examiner* — Justin C Dodson
(74) *Attorney, Agent, or Firm* — SNELL & WILMER L.L.P.

(57) ABSTRACT

An internal heating trace assembly may include a first bus bar, a second bus bar, a plurality of ceramic positive temperature coefficient (PTC) elements, and an insulator. The ceramic PTC elements may be disposed in parallel between the first bus bar and the second bus bar. The insulator may include a heat-shrink tubing. The ceramic PTC element may include a PTC strip or a PTC bead.

7 Claims, 5 Drawing Sheets

(56) References Cited

U.S. PATENT DOCUMENTS

| | | |
|---|---|---|
| 7,721,292 B2 | 5/2010 | Frasier |
| 7,800,028 B2 | 9/2010 | Wang |
| 8,348,602 B2 | 1/2013 | Botrel |
| 8,466,392 B2 | 6/2013 | O'Connor et al. |
| 8,569,663 B2 | 10/2013 | Qin et al. |
| 8,952,300 B2 | 2/2015 | Malone et al. |
| 9,011,079 B2 | 4/2015 | Coign |
| 9,049,749 B2 | 6/2015 | Huang |
| 9,845,691 B2 | 12/2017 | Allen |
| 9,942,947 B2 | 4/2018 | Maher et al. |
| 9,994,325 B2 | 6/2018 | Hu |
| 2001/0002669 A1* | 6/2001 | Kochman ............ A41D 13/0051 219/545 |
| 2008/0271801 A1* | 11/2008 | Sonderegger ............ H05B 3/58 138/33 |
| 2009/0004712 A1 | 2/2009 | Medynski |
| 2010/0150535 A1* | 6/2010 | Sasaki ................ H05B 3/44 392/441 |
| 2011/0229305 A1 | 9/2011 | Bergman |
| 2012/0128497 A1 | 5/2012 | Rowley |
| 2013/0005197 A1 | 2/2013 | Durocher |
| 2013/0031914 A1 | 2/2013 | Lee |
| 2013/0048128 A1 | 2/2013 | Roederer et al. |
| 2013/0186966 A1* | 7/2013 | Taguchi ................ F24D 13/04 237/57 |
| 2014/0035328 A1 | 2/2014 | Luketic |
| 2014/0193143 A1* | 7/2014 | Reusche ................ H05B 3/58 392/472 |
| 2015/0083863 A1 | 3/2015 | Karthauser et al. |
| 2015/0296566 A1* | 10/2015 | Gries ...................... H05B 3/06 219/541 |
| 2016/0069570 A1 | 3/2016 | Twardochleb |
| 2016/0178234 A1* | 6/2016 | Hayden .................. F24H 1/103 392/486 |
| 2016/0360573 A1* | 12/2016 | Bohlender ............... H05B 3/06 |
| 2017/0016421 A1* | 1/2017 | Oen ...................... F24H 9/1827 |
| 2017/0198852 A1* | 7/2017 | Daniel ..................... H05B 3/06 |
| 2017/0211479 A1 | 7/2017 | Little |
| 2018/0222135 A1 | 8/2018 | Dias Borges Vianna et al. |

OTHER PUBLICATIONS

USPTO, Restriction/Election Requirement dated Feb. 22, 2018 in U.S. Appl. No. 14/823,394.
USPTO, Preinterview first Office Action dated Jul. 25, 2018 in U.S. Appl. No. 14/823,394.
USPTO, First action Interview Office Action dated Sep. 28, 2018 in U.S. Appl. No. 14/823,394.
USPTO, Final Office Action dated Feb. 11, 2019 in U.S. Appl. No. 14/823,394.
USPTO, Advisory Action dated Apr. 12, 2019 in U.S. Appl. No. 14/823,394.
USPTO, Non-Final Office Action dated Jun. 14, 2019 in U.S. Appl. No. 14/823,394.
USPTO, Notice of Allowance dated Dec. 12, 2019 in U.S. Appl. No. 14/823,394.
European Patent Office, European Office Action dated Mar. 30, 2023 in Application No. 20201810.7.

* cited by examiner

SECT. A-A

INTERNAL HEATING TRACE ASSEMBLY

FIELD

The present disclosure relates to a heating trace system, and more particularly, to internal heating trace assembly use in a heating trace system.

BACKGROUND

Internal heating traces may be utilized in tube assemblies to regulate temperature of a fluid disposed in the tube assemblies. Internal heating traces may rely on a controller to prevent overheating. Typical internal heating traces may have relatively loose temperature control.

SUMMARY

An internal heating trace assembly is disclosed herein. The internal heating trace assembly may comprise: an insulator configured to insulate electricity; a first bus bar disposed within the insulator; a second bus bar disposed within the insulator; and a plurality of ceramic positive temperature coefficient (PTC) elements disposed in parallel between the first bus bar and the second bus bar.

In various embodiments, each ceramic PTC element in the plurality of ceramic PTC elements is a ceramic PTC strip. The ceramic PTC strip may extend from the first bus bar to the second bus bar. The ceramic PTC strip may comprise a first side and a second side, wherein the first side soldered to the first bus bar, and wherein the second side is soldered to the second bus bar. Each ceramic PTC element in the plurality of ceramic PTC elements may be a ceramic PTC bead. The internal heating trace assembly may further comprise a first conductive leg and a second conductive leg, the first conductive leg disposed between the first bus bar and the ceramic PTC bead, the second conductive leg disposed between the second bus bar and the ceramic PTC bead. The first conductive leg may be soldered to the first bus bar and the ceramic PTC bead. The second conductive leg may be soldered to the second bus bar and the ceramic PTC bead. The insulator may comprise heat-shrink tubing.

A water system for use on an aircraft is disclosed herein. The water system may comprise: a tube including a first inlet, a second inlet, and an outlet, the second inlet disposed between the first inlet and the outlet; an electrical interface disposed at the second inlet; an internal heating trace assembly disposed in the tube, a first end of the internal heating trace assembly coupled to the electrical interface, the internal heating trace assembly comprising: an insulator configured to insulate electricity; a first bus bar disposed within the insulator, the first bus bar in electrical communication with the electrical interface; a second bus bar disposed within the insulator, the second bus bar in electrical communication with the electrical interface; and a plurality of ceramic positive temperature coefficient (PTC) elements disposed in parallel between the first bus bar and the second bus bar.

In various embodiments, the internal heating trace assembly may comprise a second end, and wherein the second end is configured to float freely during operation of the water system. The water may be configured to flow from the first inlet to the outlet. Each ceramic PTC element in the plurality of ceramic PTC elements may be a ceramic PTC strip. The ceramic PTC strip may extend from the first bus bar to the second bus bar. The ceramic PTC strip may comprise a first side and a second side. The first side may be soldered to the first bus bar. The second side may be soldered to the second bus bar. Each ceramic PTC element in the plurality of ceramic PTC elements may be a ceramic PTC bead. The internal heating trace assembly may further comprise a first conductive leg and a second conductive leg, the first conductive leg disposed between the first bus bar and the ceramic PTC bead, the second conductive leg disposed between the second bus bar and the ceramic PTC bead. The first conductive leg may be soldered to the first bus bar and the ceramic PTC bead, wherein the second conductive leg is soldered to the second bus bar and the ceramic PTC bead. The insulator may comprise heat-shrink tubing.

A method of manufacturing an internal heating trace assembly is disclosed herein. The method may comprise: coupling a first ceramic positive temperature coefficient (PTC) element to a first bus bar; coupling the first ceramic PTC element to a second bus bar; coupling a second ceramic PTC element to the first bus bar; coupling the second ceramic PTC element to the second bus bar; disposing the first ceramic PTC element, the second ceramic PTC element, the first bus bar, and the second bus bar in a heat-shrink tubing; and applying heat to the heat-shrink tubing. In various embodiments, the method may further comprise sealing a first end of the heat-shrink tubing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact.

Disclosed herein is an internal heating trace assembly. The internal heating trace assembly comprises, in various embodiments, a first bus bar, a second bus bar, and a plurality of ceramic Positive Temperature Coefficient (PTC) elements. The ceramic PTC elements may be disposed in parallel between the bus bars. The internal heating trace assembly may further comprise an electrical insulator. The first bus bar, second bus bar, and plurality of ceramic PTC elements may be disposed within the insulator. The internal heating trace assembly, in various embodiments, may be configured to provide temperature control continuously along the length of the internal trace heating assembly. The internal heating trace assembly may generate power savings in a heating trace system.

Figure 1:
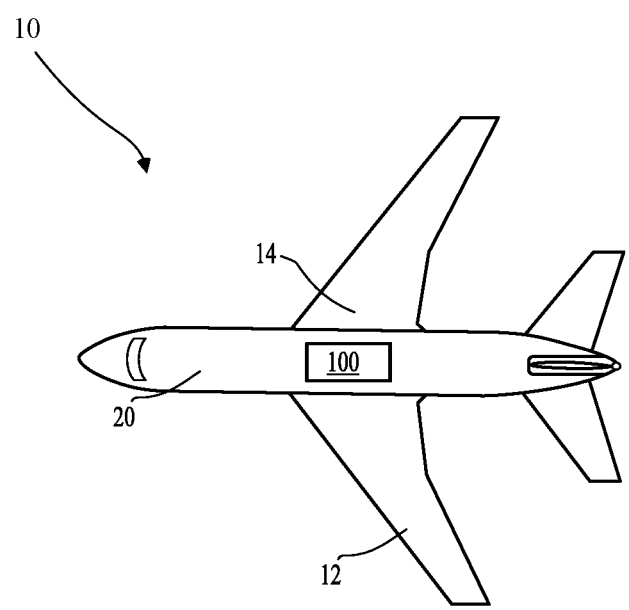
FIG. 1 illustrates a plain view showing an aircraft, in accordance with various embodiments.

With reference to FIG. 1, an aircraft 10 is provided with a fuselage 20, a left side wing 12 and a right side wing 14. The left side wing 12 and right side wing 14 are designed to provide lift to the aircraft and enable it to fly. The fuselage 20 may house passengers, as well as various components configured to operate aircraft 10. In various embodiments, the fuselage 20 may comprise a water system 100. Water system 100 may be a potable water system, a gray water system, or the like. Water system 100 may be disposed in an area of fuselage 20 that is susceptible to outside temperature control. As such, at high altitudes, water system 100 may be exposed to temperatures below freezing. Water system 100 may be temperature controlled by an internal heating trace assembly.

Figure 2:
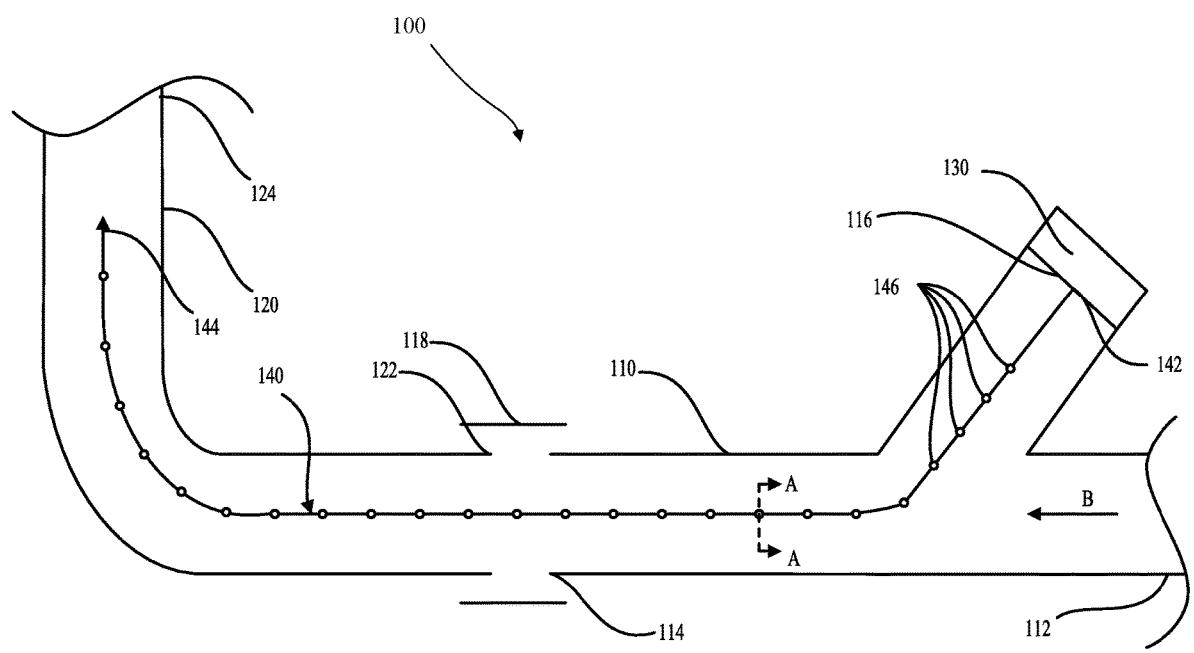
FIG. 2 illustrates a potable water system of an aircraft, in accordance with various embodiments.

Referring now to FIG. 2, a schematic view of a portion of a water system 100 for use on an aircraft 10, in accordance with various embodiments, is illustrated. The water system 100 comprises a first tube 110, a second tube 120, an electrical interface 130, and an internal heating trace assembly 140. The first tube 110 may comprise a wye shape, a tee shape, or the like. The first tube 110 may comprise a water inlet 112, a water outlet 114, and a heating trace inlet 116. The second tube 120 may comprise a water inlet 122 and a water outlet 124. The water inlet 122 of the second tube 120 may be coupled to the water outlet 114 of the first tube 110 by any method known in the art. For example, water inlet 122 of the second tube 120 may be coupled to the water outlet 114 of the first tube 110 by a coupling 118, such as a threaded fitting, two-ferrule fitting, a single ferrule fitting, a ferrule-less push-fit connector, a collar fitting, or the like. In various embodiments, the coupling 118 may comprise bonding or soldering first tube 110 to second tube 120. The water system 100 may flow in a first direction B from water inlet 112 from first tube 110 through water outlet 124 of second tube 120.

In various embodiments, electrical interface 130 is disposed at the heating trace inlet 116 of the first tube 110. The electrical interface 130 may be any electrical interface 130 known in the art, such as an electrical connector or the like. The electrical interface 130 may be in electrical communication with a controller and/or a monitoring system. The electrical interface 130 is coupled to the internal heating trace assembly 140. The internal heating trace assembly 140 is in electrical communication with the electrical interface 130. A first end 142 internal heating trace assembly 140 is fixed at the electrical interface 130 and the second end 144 is free within the water system 100. For example, second end 144 may be free in second tube 120 or an upstream tube in water system 100. The internal heating trace assembly 140 may be configured to control a temperature of water disposed in water system 100 during operation. In various embodiments, bus wires disposed in the internal heating trace assembly 140 may conduct current from the electrical interface 130 through the length of the internal heating trace assembly 140 during operation.

In various embodiments, internal heating trace assembly 140 comprises a plurality of ceramic PTC elements 146 disposed in parallel along a length of the internal heating trace assembly 140. In various embodiments, each ceramic PTC element in the plurality of ceramic PTC elements 146 may act as a resistor. Each ceramic PTC element in the plurality of ceramic PTC elements 146 is a discrete ceramic PTC element in relation to an adjacent ceramic PTC element. As such, the internal heating trace assembly 140 may be configured to control a temperature of the internal heating trace assembly 140, and in turn the water in water system 100, continuously along the length of the internal heating trace assembly 140.

In various embodiments, the plurality of ceramic PTC elements 146 are uniformly spaced about the internal heating trace assembly 140. In various embodiments, the spacing between adjacent ceramic PTC elements in the plurality of ceramic PTC elements varies along the length of the internal heating trace assembly 140. As such, an internal heating trace assembly 140 may be configured based on a specific design application. For example, one area may need greater temperature than another area of the internal heating trace assembly 140, so more PTC elements may be placed in the area that would benefit from greater temperature applied compared to another area of the internal heating trace assembly 140. Additionally, ceramic PTC elements have greater thermal stability compared to typical PTC polymers; however, ceramic PTC elements may be more brittle than typical PTC polymers. By orienting the ceramic PTC elements in parallel, electrically and physically, the ceramic PTC elements may be more structurally sound compared to a ceramic PTC element extending along the entire length of the internal heating trace assembly 140.

Although water system 100 is disclosed with respect to an aircraft 10, any water system with temperature control is within the scope of this disclosure.

Figures 3A, 3B:
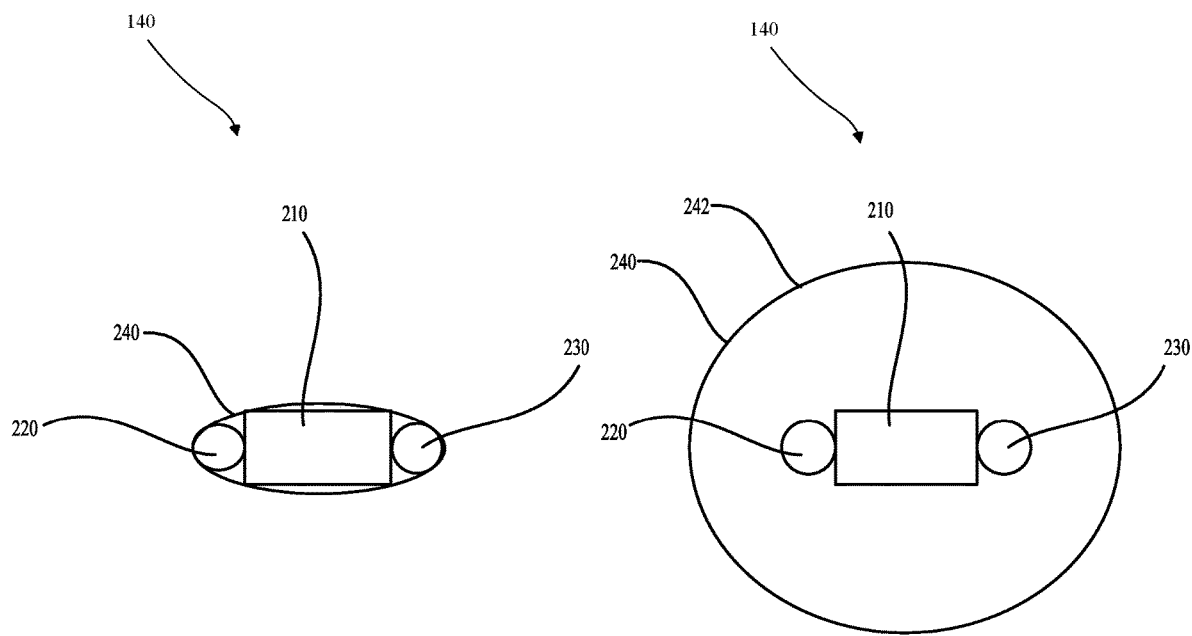
FIG. 3A illustrates a cross-sectional view of an internal heating trace assembly, in accordance with various embodiments.
FIG. 3B illustrates a cross-sectional view of an internal heating trace assembly during manufacturing, in accordance with various embodiments.

Referring now to FIG. 3A, a cross-sectional view of internal heating trace assembly 140 along section A-A from FIG. 2, in accordance with various embodiments, is illustrated. Internal heating trace assembly 140 comprises a ceramic PTC element 210, a first bus bar 220, a second bus bar 230, and an insulator 240. In various embodiments, the plurality of ceramic PTC elements 146 from FIG. 2 may include the ceramic PTC element 210. The ceramic PTC element 210 may be disposed between, and coupled to, the first bus bar 220 and the second bus bar 230. In various embodiment, the ceramic PTC element is in electrical communication with the first bus bar 220 and the second bus bar 230. The first bus bar 220 and the second bus bar 230 may be any conductive element known in the art, such as a wire or the like. The first bus bar 220 and the second bus bar 230 may be electrically coupled to the electrical interface 130 from FIG. 2. The first bus bar 220 and the second bus bar 230 may be configured to carry an electrical current and the ceramic PTC element 210 may be configured to act as a resistor in internal heating trace assembly 140.

In various embodiments, insulator 240 is disposed around the first bus bar 220, the second bus bar 230, and the ceramic PTC element 210. The insulator 240 may be any electrical insulator known in the art (e.g., polyethylene, cross linked polyethylene-XLPE, polyvinyl chloride PVC, Polytetrafluorethylene (PTFE), silicone, polyolefin, fluoropolymer, etc.). The insulator 240 may be configured to insulate the electricity generated from the first bus bar 220, the second bus bar 230, and the ceramic PTC element 210 from the water disposed in water system 100 from FIG. 2.

Referring now to FIG. 3B, a cross-section of internal heating trace assembly 140 during manufacturing, in accordance with various embodiments, is illustrated. In various embodiments, each ceramic PTC element 210 in the plurality of ceramic PTC elements of an internal heating trace assembly may be electrically coupled to the first bus bar 220 and the second bus bar 230 by any method known in the art (e.g., soldering). After the plurality of ceramic PTC elements are coupled to the first bus bar 220 and the second bus bar 230, the first bus bar 220, second bus bar 230, and the plurality of ceramic PTC elements are disposed in an insulator 240.

In various embodiments, the insulator 240 is a heat-shrink tubing 242. As such, the first bus bar 220, the second bus bar 230, and the plurality of ceramic PTC elements may easily be disposed in heat-shrink tubing 242 in its un-shrunk state (FIG. 3B). After the first bus bar 220, the second bus bar 230, and the plurality of ceramic PTC elements are disposed in the heat-shrink tubing 242, heat is applied to the heat-shrink tubing 242 by any method known in the art, such as via an oven, a hot air gun, a source of hot gas, or the like. As a result, heat-shrink tubing 242 may shrink and contact the first bus bar 220, the second bus bar 230, and the ceramic PTC element 210 (as shown in FIG. 3A), resulting in an internal heating trace assembly 140. The heat-shrink tubing 242 may be any thermoplastic material known in the art, such as elastomeric, fluorinated ethylene propylene (FEP), polyolefin, or the like. The heat-shrink tubing 242 may include an internal layer of hot-melt adhesive to enhance the thermal bond between heat-shrink tubing 242 and the PTC elements 210.

Figure 4A:
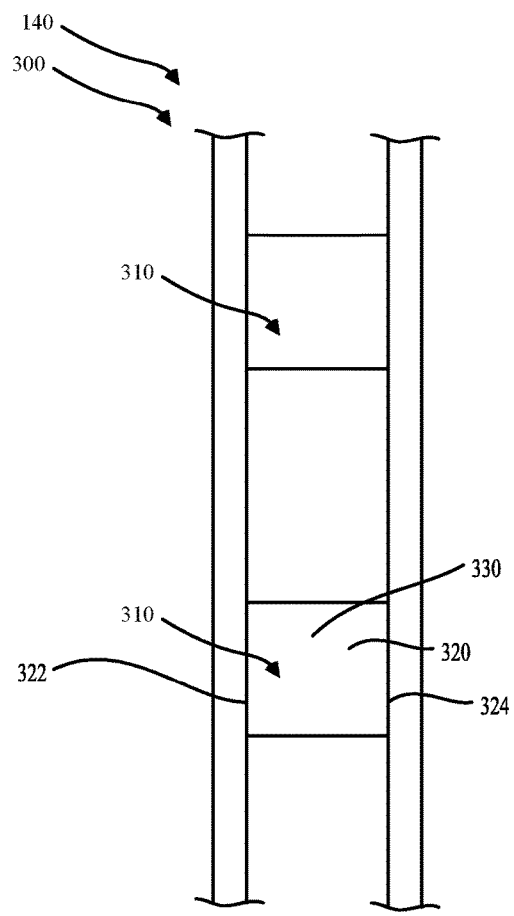
FIG. 4A illustrates a portion of an internal heating trace assembly, in accordance with various embodiments.

Referring now to FIG. 4A, a portion of an internal heating trace assembly (140, 300), in accordance with various embodiments, is illustrated. The internal heating trace assembly comprises a first bus bar 220, a second bus bar 230, and a plurality of ceramic PTC elements 310 disposed in parallel. Each ceramic PTC element in the plurality of ceramic PTC elements 310 may comprise a first side and a second side. For example, first ceramic PTC element 320 in the plurality of ceramic PTC elements 310 may comprise a first side 322 and a second side 324. The first side 322 may be coupled to first bus bar 220 by any method known in the art (e.g., soldering). Similarly, second side 324 may be coupled to second bus bar 230 by any method known in the art (e.g., soldering). As such, each ceramic PTC element in the plurality of ceramic PTC elements 310 may comprise a ceramic PTC strip extending from first bus bar 220 to second bus bar 230. For example, the first ceramic PTC element 320 may comprise a ceramic PTC strip extending from first bus bar 220 to second bus bar 230.

Figure 4B:
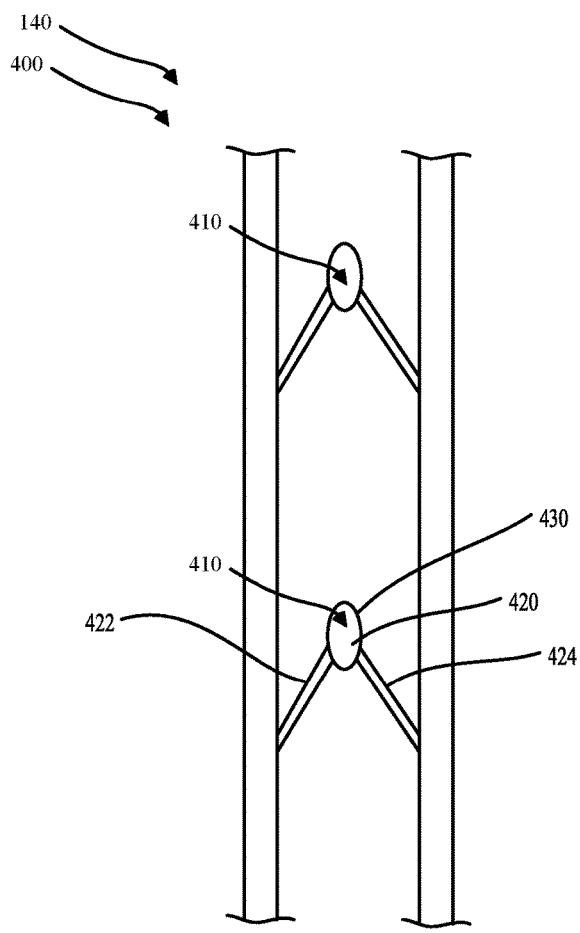
FIG. 4B illustrates a portion of an internal heating trace assembly, in accordance with various embodiments.

Referring now to FIG. 4B, a portion of an internal heating trace assembly (140, 400), in accordance with various embodiments, is illustrated. The internal heating trace assembly 400 comprises a first bus bar 220, a second bus bar 230, and a plurality of ceramic PTC elements 410 disposed in parallel. Each ceramic PTC element in the plurality of ceramic PTC elements 310 may comprise a ceramic PTC bead. For example, first ceramic PTC element 420 in the plurality of ceramic PTC elements 410 may comprise a ceramic PTC bead 430. The ceramic PTC bead 430 may be disposed between the first bus bar 220 and the second bus bar 230.

The ceramic PTC bead 430 may be coupled to the first bus bar 220 via a first conductive leg 422 extending from ceramic PTC bead 430 to the first bus bar 220. Similarly, ceramic PTC bead 430 may be coupled to the second bus bar via a second conductive leg 424 extending from ceramic PTC bead 430 to the second bus bar 230. In various embodiments, first conductive leg 422 has a first end 421 and a second end 423. The first end 421 of first conductive leg 422 may be coupled to first bus bar 220 by any method known in the art (e.g., soldering) and the second end 423 of first conductive leg 422 may be coupled to ceramic PTC bead 430 by any method known in the art (e.g., soldering). The second conductive leg 424 may be coupled to ceramic PTC bead 430 and second bus bar 230 in the same manner as first conductive leg 422. The first conductive leg 422 and the second conductive leg 424 may be any conductive material known in the art (e.g., copper, silver, or the like).

Figure 5:
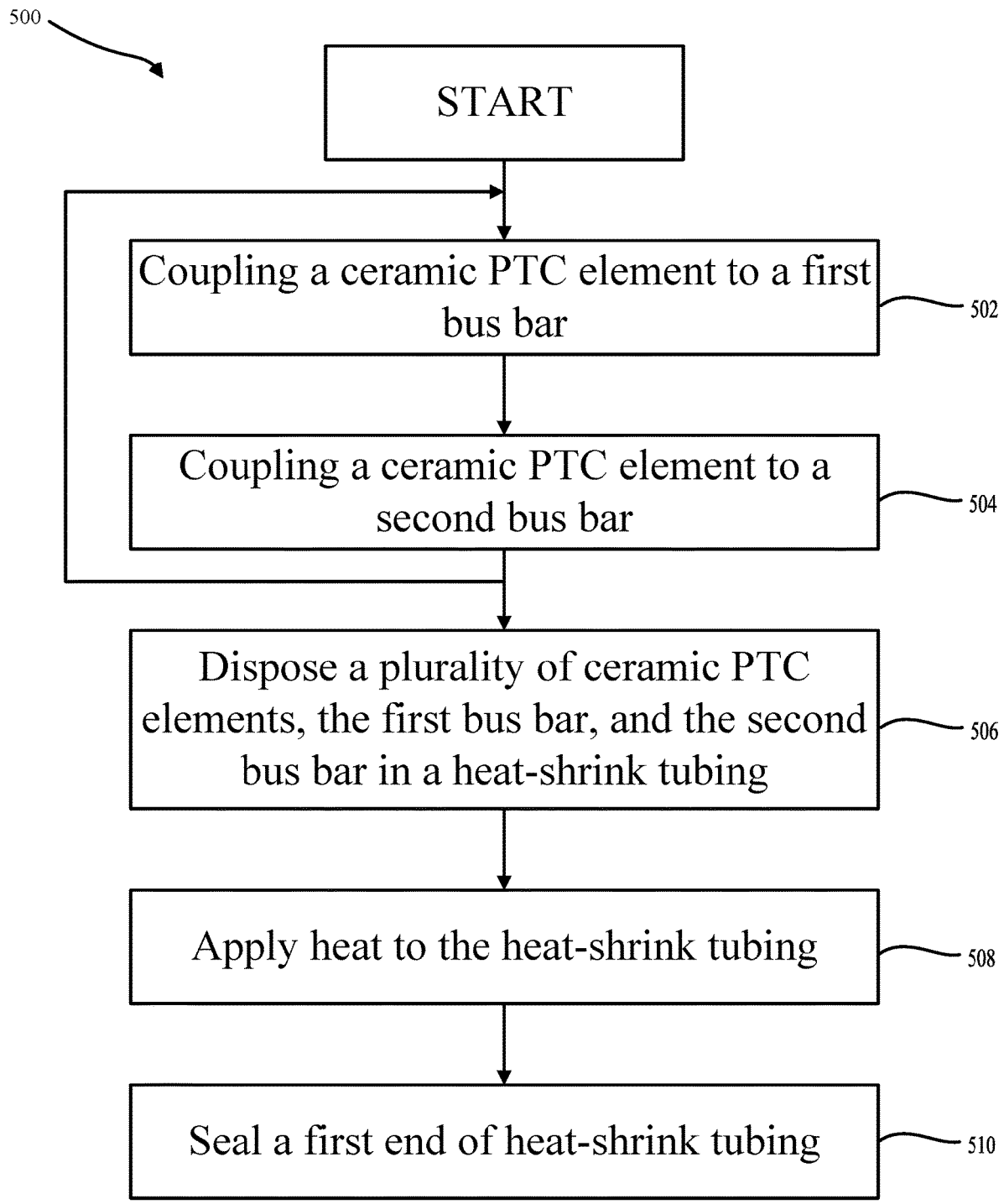
FIG. 5 illustrates a method of manufacturing an internal heating trace assembly, in accordance with various embodiments.

Referring now to FIG. 5, a method 500 for manufacturing an internal heating trace assembly, in accordance with various embodiments, is illustrated. The method may comprise coupling a ceramic PTC element to a first bus bar (step 502). The ceramic PTC element may be a ceramic PTC strip (as illustrated in FIG. 4A), a ceramic PTC bead (as illustrated in FIG. 4B), or the like. The first bus bar may be any conductive element known in the art, such as a copper wire or the like. The PTC element may be coupled to the first bus bar by soldering, or any other method known in the art. The method may further comprise coupling the ceramic PTC element to a second bus bar (step 504). The ceramic PTC element may be coupled to the second bus bar in the same manner as the ceramic PTC element is coupled to the first bus bar. The second bus bar may be of equal length as the first bus bar.

The method may further comprise repeating steps 502 and 504 until a plurality of ceramic PTC elements are disposed in parallel between the first bus bar and the second bus bar. The number of ceramic PTC elements for a given application may be a design choice based on the heating requirements of a given system. The method may further comprise disposing the plurality of ceramic PTC elements, the first bus bar, and the second bus bar in a heat-shrink tubing (step 506). The heat-shrink tubing may be any heat-shrink tubing known in the art, such as heat-shrink tubing 242 (from FIG. 3B). The method may further comprise applying heat to the heat-shrink tubing (step 508). By applying heat to the heat-shrink tubing, the heat-shrink tubing may shrink and wrap tightly around the first bus bar, the second bus bar, and the plurality of ceramic PTC elements.

The method may further comprise sealing a first end of heat-shrink tubing (step 510). The first end may be sealed by any method known in the art, such as a heat-shrink end cap or the like. The second end may have the first bus bar and the second bus bar exposed and/or extending out of the second end of the heat-shrink tubing to allow the first bus bar and the second bus bar to be coupled to an electrical component. In various embodiments, the second end of the heat shrink tubing may be sealed in a manner similar to the first end of the heat-shrink tubing, and the wires may be exposed just prior to use (i.e., just prior to electrically coupling the wires to an electrical component).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft, comprising:
   a fuselage;
   a water system disposed in the fuselage, the water system comprising:
      a first tube including a first inlet, a second inlet, and an outlet, the second inlet disposed between the first inlet and the outlet, the tube defining a longitudinal axis, wherein water is configured to flow in a direction defined by the longitudinal axis from the first inlet through the outlet;
      a second tube coupled to the outlet of the first tube;
      an electrical interface disposed at the second inlet;
      an internal heating trace assembly disposed in the tube and extending from a first longitudinal end to a second longitudinal end, the first longitudinal end of the internal heating trace assembly coupled to the electrical interface, the second longitudinal end configured to float freely in the upstream tube during operation of the water system, at least a portion of the internal heating trace assembly extending in a direction defined by the longitudinal axis of the tube, the internal heating trace assembly comprising:
         an insulator configured to insulate electricity;
         a first bus bar disposed within the insulator, the first bus bar in electrical communication with the electrical interface;
         a second bus bar disposed within the insulator, the second bus bar in electrical communication with the electrical interface; and
         a plurality of ceramic positive temperature coefficient (PTC) elements disposed in parallel between the first bus bar and the second bus bar, wherein:
            each ceramic PTC element in the plurality of ceramic PTC elements is connected to the first bus bar by a first conductive leg extending from the first bus bar to the PTC element at a first acute angle relative to the first bus bar,
            each ceramic PTC element in the plurality of ceramic PTC elements is connected to the second bus bar by a second conductive leg extending from the second bus bar to the PTC element at a second acute angle relative to the second bus bar.

2. The aircraft of claim 1, wherein water is configured to flow from the first inlet to the outlet.

3. The aircraft of claim 1, wherein each ceramic PTC element in the plurality of ceramic PTC elements is a ceramic PTC strip.

4. The aircraft of claim 3, wherein the ceramic PTC strip extends from the first bus bar to the second bus bar.

5. The aircraft of claim 4, wherein the ceramic PTC strip comprises a first side and a second side, wherein the first side is soldered to the first bus bar, and wherein the second side is soldered to the second bus bar.

6. The aircraft of claim 1, wherein the first conductive leg is soldered to the first bus bar and the ceramic PTC element, wherein the second conductive leg is soldered to the second bus bar and the ceramic PTC element.

7. The aircraft of claim 1, wherein the insulator comprises heat-shrink tubing.

* * * * *